United States Patent
Dziwok et al.

(10) Patent No.: US 7,335,699 B2
(45) Date of Patent: Feb. 26, 2008

(54) COPOLYMERS CONTAINING AMINOPLAST UNITS AND USE THEREOF AS A DISPERSING AGENT OR STABILIZERS

(75) Inventors: Klaus Dziwok, Freilassing (DE); Inge Krämer, Freising (DE); Norbert Schall, Forstern (DE); Helmut Coutelle, Freising (DE); Sabine Huth, Landshut (DE); Alan Steinmetz, Louisville, KY (US); Thadeus Schauer, Neuhengstett (DE); Heinz Greisiger, Reutlingen (DE); Mark Entenmann, Fellbach (DE)

(73) Assignee: Sud-Chemie AG, Munich (DE)

( * ) Notice: Subject to any disclaimer, the term of this patent is extended or adjusted under 35 U.S.C. 154(b) by 349 days.

(21) Appl. No.: 10/500,059

(22) PCT Filed: Dec. 17, 2002

(86) PCT No.: PCT/EP02/14419

§ 371 (c)(1),
(2), (4) Date: Jan. 3, 2005

(87) PCT Pub. No.: WO03/055928

PCT Pub. Date: Jul. 10, 2003

(65) Prior Publication Data

US 2005/0119442 A1    Jun. 2, 2005

(30) Foreign Application Priority Data

Dec. 24, 2001 (DE) ................ 101 63 985

(51) Int. Cl.
*C08G 73/06* (2006.01)
*C08G 12/42* (2006.01)

(52) U.S. Cl. ............... 525/54.21; 525/54.23; 525/57; 525/58; 525/143; 525/155; 525/161; 525/163; 525/406; 525/411; 525/412; 525/414

(58) Field of Classification Search ............ None
See application file for complete search history.

(56) References Cited

U.S. PATENT DOCUMENTS

| | | | |
|---|---|---|---|
| 5,627,232 A | 5/1997 | Glancy et al. | |
| 5,629,373 A | 5/1997 | Glancy et al. | |
| 5,882,393 A | 3/1999 | Quednau et al. | |
| 5,914,373 A | 6/1999 | Glancy et al. | |
| 5,990,245 A | 11/1999 | Esselborn et al. | |
| 6,235,813 B1 | 5/2001 | Brandt et al. | |
| 6,423,785 B1 | 7/2002 | Esselborn et al. | |
| 6,596,073 B1 | 7/2003 | Nyssen et al. | |
| 6,596,816 B1 | 7/2003 | Haubennestel et al. | |
| 2004/0102585 A1* | 5/2004 | Steinmetz et al. | 525/510 |

FOREIGN PATENT DOCUMENTS

| | | | |
|---|---|---|---|
| WO | WO 01/12712 | | 2/2001 |
| WO | WO-02/12363 | * | 2/2002 |

OTHER PUBLICATIONS

Schmitz, et al., "To Optimally Formulate with Variable Building Blocks", *Farbe & Lack* 106, Mar. 2000, pp. 28-36. (Translation; original German text also submitted.).

* cited by examiner

Primary Examiner—David J. Buttner
(74) Attorney, Agent, or Firm—Scott R. Cox

(57) ABSTRACT

A description is given of water-soluble aminoplast ether copolymers of the following structural type:

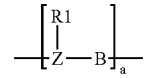

wherein Z is a glycoluril central unit, B is a radical of an essentially water-insoluble polymer and R1 is a radical of a hydrophilic organic compound. The ratio R1:B is selected within a range of about 1.5 to 4:1 and the overall mass of the water-soluble aminoplast ether copolymer is from about 2000 to 50 000 g/mol such that the copolymer is soluble in water and may be used as a dispersant for e.g. pigments in polar solvents, e.g. water.

13 Claims, 4 Drawing Sheets

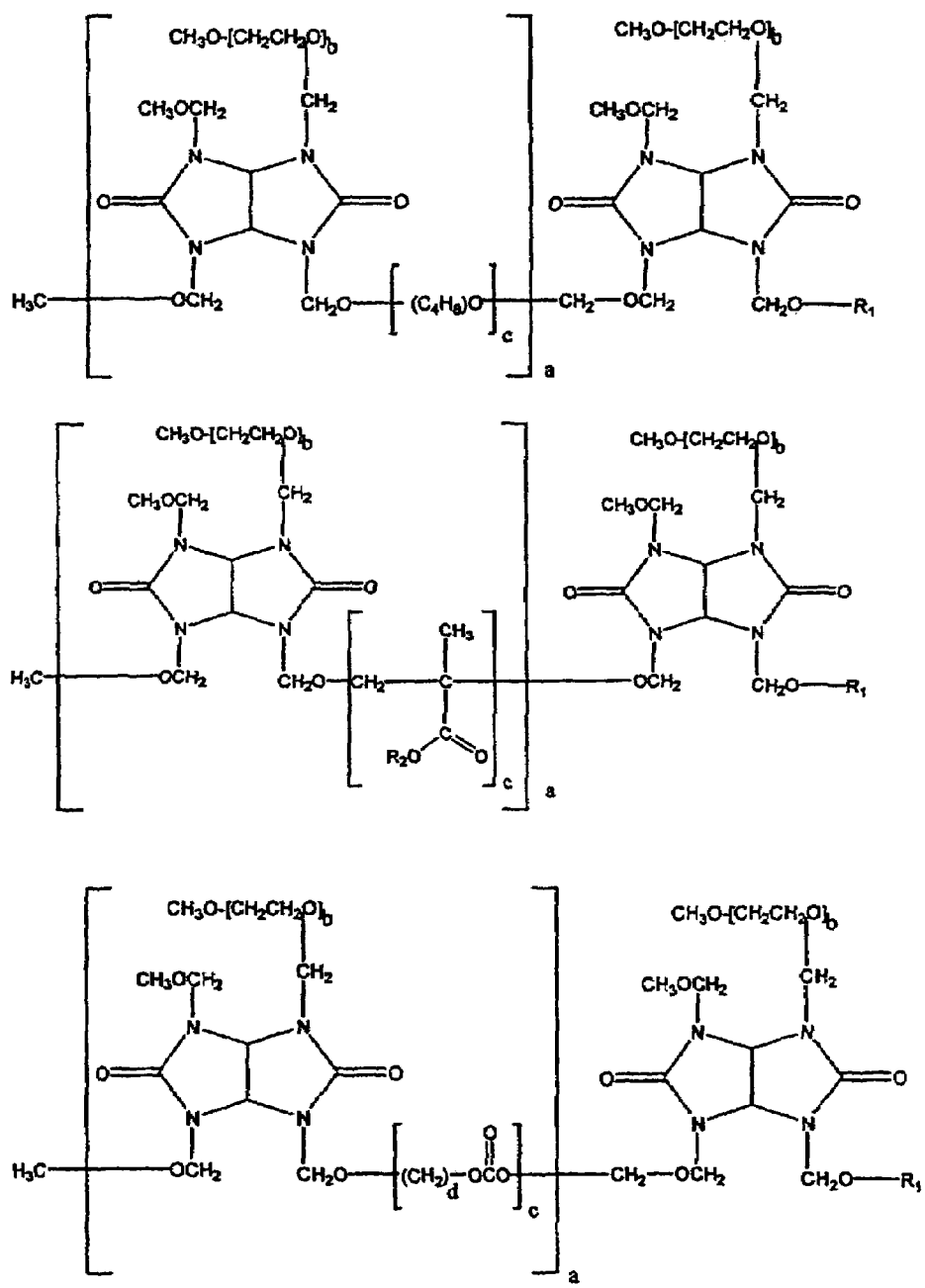
Fig. 2.1

Fig. 2.2
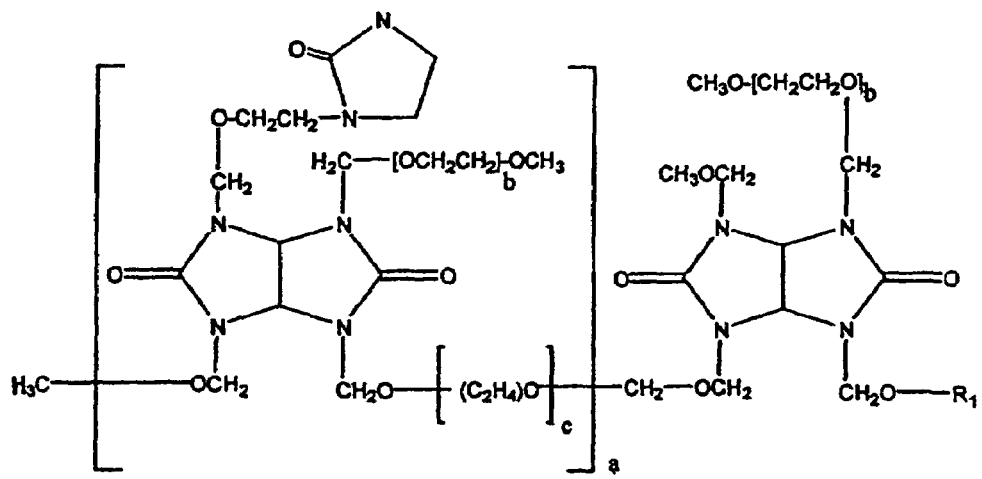
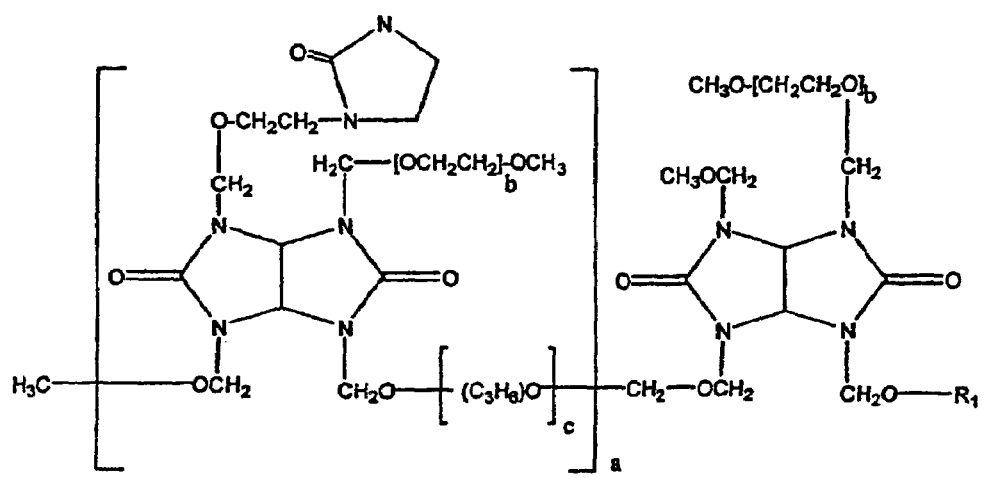
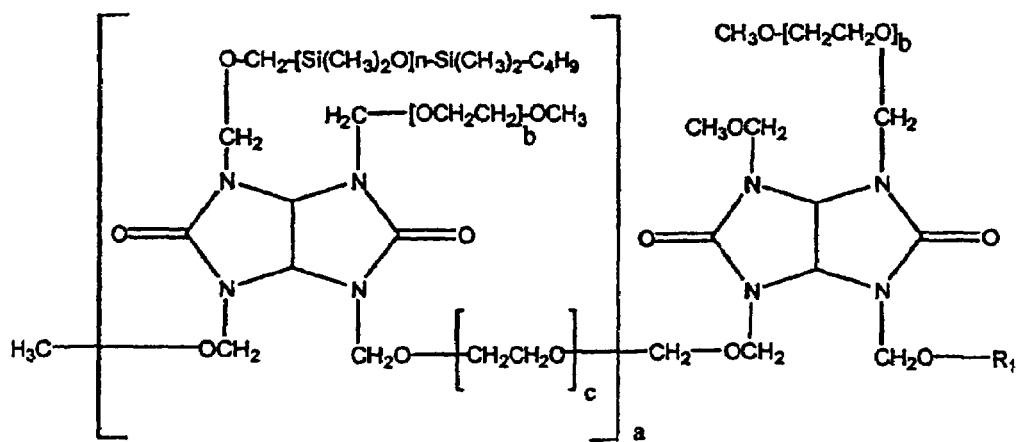

Fig. 2.3
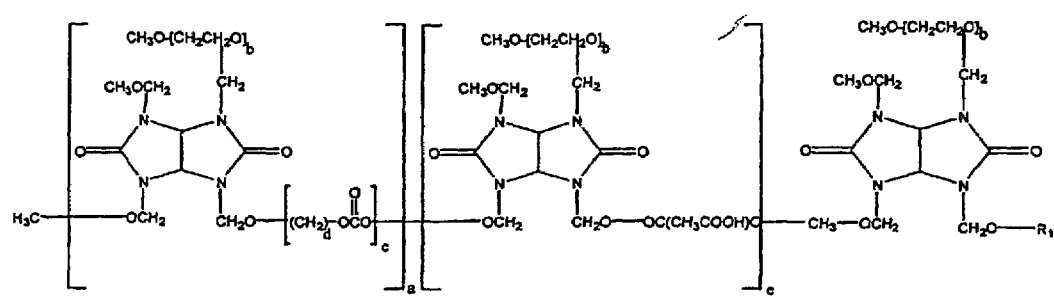

COPOLYMERS CONTAINING AMINOPLAST UNITS AND USE THEREOF AS A DISPERSING AGENT OR STABILIZERS

BACKGROUND

This application is the U.S. national stage application of PCT/EP02/14419 (WO 03/055928) with an international filing date of Dec. 17, 2002 claiming priority from DE 101 63 985.6 which was filed on Dec. 24, 2001.

The invention relates to innovative aminoplast ether copolymers, to a process for preparing them and to their use as dispersants or stabilizers.

The aminoplast units normally employed as crosslinking agents in the curing of paints and varnishes or polymers can be used for linking chemically different structures. Thus is it possible to prepare corresponding products containing alkyl, ether, ester, amine or urethane groups.

According to Römpp Lexikon: Lacke and Druckfarben, 1998, Georg Thieme Verlag, Stuttgart, New York, 148, dispersants are surface-active substances which facilitate the dispersing of a pulverulent substance, e.g., a pigment or filler, in a liquid dispersing medium by lowering the surface tension between the two components. Dispersants facilitate the mechanical disruption of agglomerates into primary particles. Additionally dispersants protect the primary particles formed, by forming a protective colloid shell or an electrochemical bilayer, against reagglomeration or flocculation. Where measures against flocculation or against sedimentation are taken deliberately that lead to steric and/or electrostatic stabilization of the pigment particles with one another, the term "stabilizers" is used. Stabilized pigments exhibit a lesser propensity to settle. In the preparation of paints and varnishes, dispersants facilitate the incorporation of pigments and fillers, which as important formulating constituents determine the visual appearance and the physicochemical properties of coatings. Moreover, dispersants may increase the compatibility between chemically different polymer types.

U.S. Pat. No. 5,629,373 and U.S. Pat. No. 5,914,373 describe water-soluble aminoplast ether copolymers containing polar base polymer units and polar side chains, which are used as water-soluble associative thickeners.

WO 02/12363 A1 (prior art under Art. 53(2) EPC) describes a special form of the associative thickeners described in U.S. Pat. No. 5,914,373. The use of a particular hydrophobicizing compound (tristyrylphenol ethoxylate) gives aqueous masonry paints or latex paints a particular stability when tinted with colorant concentrates. The expression "associative thickener" is explained on page 1, last paragraph as:

" . . . is recognized in the art to mean a nonionic hydrophobically modified water-soluble polymer . . . "

On page 12, line 6 after the formulae it is specified that the most preferred hydrophobic attached group is tristyrylphenol. Here as well the application is directed very clearly to an aqueous paint. What is described is a special case of the first publication.

The present invention is significantly more advanced in contrast to the two aforementioned publications.

A common feature of all the publications is that predominantly linear polymers can be prepared on the basis of the aminoplast technology. In the present case, however, it has been recognized for the first time that the technique involved is a graft polymer technique which certainly offers further possibilities. This is set out also on page 8, para. 1. It is true that the inventive step does not lie in preparing linear, aminoplast-linked chains but rather in the fact that now also the "inverse" forms are claimed, i.e., polymers containing water-insoluble base polymer chains and hydrophilic end groups, which in particular can also be used in completely polar media. Hybrid forms are likewise conceivable, with the activity to be achieved generally having nothing to do with the thickening effect (associative linking) but rather with a surface wetting.

Dispersants for pigments and pigment compositions comprising them are described for example in DE 199 04 603 A1, DE 198 36 253 C1, DE 199 05 269 A1, WO 97/26984 and EP-A-0 879 860.

In accordance with the state of the art the stabilization of pigment dispersions and filler dispersions is essentially by steric hindrance in solventborne systems and predominantly electrochemical in aqueous systems. In aqueous systems in particular it is possible, in the course of preparation and processing, for numerous problems to occur, which are described in Juan M. Oyarzún, Handbuch der Pigmentverarbeitung, Vincentz-Verlag, 1998:

difficulty of pigment incorporation, or wetting deterioration in Theological properties sedimentation pigment floating low compatibility with various binders deficient hydrolysis resistance adequate activity only with large amounts added low gloss, low hiding power, inadequate color strength poorly reproducible shades.

Normally use is made of anionic, cationic, nonionic or amphoteric dispersants, if desired in polymeric form. In aqueous systems in particular additives are used that are based on mineral oils, polyacrylates, modified silicones and alkylphenol ethoxylates. Mineral oils, however, lower the gloss and the transparency of the coating and tend toward separation in systems with low levels of pigmentation. Disadvantages of modified natural materials include their low water resistance and biostability. The polyacrylates that are in the foreground at present in some cases adversely affect the water resistance, gloss and transparency. The use of alkylphenol ethoxylates is objectionable from an ecotoxicological standpoint, while silicones in some cases exhibit interadhesion problems and cratering problems (Schmitz et al., Farbe&Lacke, March 2000).

Improvement to the prior art dispersants is also required in respect of their universal usefulness, such as, for example, the compatibility with modern aqueous binder systems (readily miscible, flocculation stability).

It was an object of the present invention to overcome the aforementioned disadvantages of the prior art and to provide novel dispersants and stabilizers which are easy to prepare and which in aqueous systems in particular exhibit extremely good performance properties. It is intended that a positive influence be exerted on the viscosity stability of pastes, the color strength and the water resistance of the coatings prepared therefrom. Additionally the flocculation and aggregation ought to be avoided. Furthermore, products ought to be used that contain no cosolvents and can be employed universally.

Surprisingly it has been found that the object of dispersing and stabilizing is achieved by means of water-soluble aminoplast ether copolymers of the following structural type:

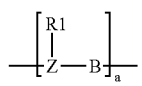

where
Z is an aminoplast unit based on a glycoluril which is unsubstituted or substituted by a reactive OR group (where R is an alkyl, alkylene, alkyl ether or alkyl ester group, preferably a lower alkyl group, e.g., a methyl or ethyl group);
B is the radical of an essentially water-insoluble polymer selected from poly-n-butyl acrylate, poly-n-butyl methacrylate, polyethyl acrylate, polytetrahydrofuran, polyethyl methacrylate, polymethyl acrylate, polymethyl methacrylate, a predominantly aliphatic polycarbonate or a predominantly aromatic polycarbonate, and more preferably from a poly-n-butyl methacrylate or a predominantly aliphatic or aromatic polycarbonate having at least two functional groups which are able to react with the OR function of the aminoplast unit, preferably having a hydroxyl function;
R1 is the radical of a hydrophilic organic compound containing at least one functional group which is able to react with the OR function of the aminoplast unit to form an ether bond, preferably having a hydroxyl function, and
a is at least 1.

The molar ratio R1:B is preferably greater than 1, in particular greater than about 1.5 to 4.

According to one particularly preferred embodiment R1 is the radical of methylcellulose, polyacrylic acid, polymethacrylic acid, ethylene/acrylic acid/sodium acrylate copolymer, polyalkylglycol, polyvinyl alcohols or polyvinylpyrrolidone, preferably the radical of a methoxy-terminated polyalkylglycol.

Preferably at least one side chain R1 is water-soluble and connected via an ether bridge to the central unit Z.

More preferably B is hydrophobic and/or R1 is hydrophilic.

The index a can be from 1 to 1000. In general the average molar mass of dispersants is from 1000 to 100 000, preferably from 2000 to 50 000, more preferably from 2500 to 40 000. The copolymers of the invention are preferably predominantly linear.

R1 (side chains of the copolymer) preferably has an average molar mass of from about 500 to 30 000 g/mol, in particular from about 1000 to 20 000 g/mol, more preferably from about 1500 to 10 000 g/mol.

B preferably has a molar mass of from about 100 to 30 000 g/mol, in particular from about 200 to 20 000 g/mol, more preferably from about 300 to 10 000 g/mol.

Additionally the overall molar mass of the aminoplast ether copolymers of the invention is preferably between about 1000 and 100 000 g/mol, in particular between about 2000 and 50 000 g/mol, more preferably between about 2500 and 40 000 g/mol.

The molar ratio B:Z is preferably between about 0.5:1 and 4:1. The molar ratio Z:R1 is preferably between about 1:0.25 and 1:5. The molar ratio R1:B is greater than 1 and is preferably about 1.5 to 4:1.

Examples of graft copolymers of the invention are depicted in FIGS. 2.1 to 2.3.

The copolymers of the invention can be prepared by known methods, e.g., in accordance with U.S. Pat. No. 5,914,373 in from 10% to 60% strength solution of an alkylated benzene (toluene or xylene). In general the aminoplast unit Z is reacted with the organic compounds from which the radicals B and R are derived, and/or with prepolymers formed therefrom, under acidic catalysis in solution or without solvents, preferably employing a one-pot method.

The preparation of similar aminoplast systems is also described in DE-A-100 38 147 in U.S. Pat. No. 5,627,232 as well, the content of which is hereby expressly incorporated by reference into the present description, the polyfunctional aminoplast units Z reacting under acid catalysis with monofunctional and polyfunctional organic compounds (R1 and B).

Surprisingly it has been found that the desired copolymers can be prepared in analogous manner by means of a one-pot reaction. For that purpose the reactants in from 15% to 35% strength solution in respect of monomers used (total reactants), in particular in from 20% to 30% strength solution, are reacted at temperatures from about 60 to 140° C., preferably from about 70 to 130° C., in solution or without solvent (in bulk). In general residues of water are removed with an inert solvent, such as toluene or xylene, for example, or by applying reduced pressure. In order to remove the low molecular mass condensation product formed during the reaction more easily (e.g., methanol, butanol), it is advisable to add an inert solvent, such as toluene, xylene or a petroleum fraction, or else to evacuate. As initiator it is usual to add acids, e.g., sulfonic acids. The optimum amount for addition is between about 0.2% and 10% by weight, preferably between about 0.2% and 7.0% by weight, based on the sum of the functional monomers. The reaction is carried out under reduced pressure, and when working with solvent the solvent removed by azeotropic distillation is continually replaced with fresh solvent.

According to one preferred embodiment a neutralizing agent, an amine for example, is added after a reaction time of from about 2 to 10 h, preferably from about 2.5 to 8 h, to give molar masses of the copolymers of from about 2000 to 50 000 g/mol, more preferably from about 2500 to 40 000 g/mol.

The progress of the reaction can be ascertained by determining the viscosity or by determining the amount of low molecular mass condensation product. The products of the reaction are liquid or thermoplastic and water-soluble.

One further aspect of the present invention relates to the provision of dispersants and stabilizers for pigments or fillers. Thus it has surprisingly been found that for this purpose the aminoplast ether copolymers of the invention in which Z is a glycoluril and B, R1 and a are as defined above exhibit unexpectedly good properties. The aminoplast ether copolymers of the invention used with preference are water-soluble and can be employed with particular advantage in aqueous systems.

Additionally it has surprisingly been found that the water-soluble graft polymers or graft copolymers of the somewhat more general formula below also constitute advantageous dispersants and stabilizers for pigments or fillers:

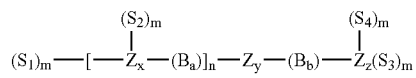

in which $(B_a)$ to $(B_b)$ are predominantly apolar base polymer chains which are identical or different from one another and which optionally have free valences for the formation of a crosslinked structure; $Z_x$ to $Z_z$ are central units which are identical or different from one another and which optionally have free valences for the formation of a crosslinked structure; $(S_1)$ to $(S_4)$ are polar or apolar side chains which are identical or different from one another; m=1 to 100, preferably 2 to 50, in particular 2 to 20, and n is an integer from 0 to 500, preferably 1 to 100, in particular 1 to 50, and the structure is completed by polar end groups.

Graft polymers and/or graft copolymers of this kind are also described in DE-A-100 38 147, the disclosure content of which in this respect is also adopted into the present description by express reference.

It is has surprisingly been found that particularly good dispersants, in particular for aqueous systems, are obtained if m is 11 to 100, in particular 12 to 50 and more preferably 12 to 20.

The main chain of the graft polymer or copolymer is essentially a linear molecule. This molecule is produced by subjecting at least one difunctional molecule to addition polymerization or polycondensation, e.g., a diisocyanate, a diester, a dicarboxylic acid, a dicarboxylic anhydride, a diol, a lactone, a lactam, or another difunctional compound from the group of the silanes or siloxanes.

In the simplest case the "side chains" are the different terminal groups (terminating end groups). In the case of graft polymers or copolymers having a very high molecular weight, however, modification via the end groups is not enough to effect substantial change in the molecular properties of these products. Such change can be expected only at relatively low molecular weights, from 10 000 to 100 000 g/mol, for example. In the case of higher molecular mass graft polymers or copolymers it is necessary to insert functional groups.

The graft polymers or copolymers can be prepared conventionally, e.g., in solvents, in water or by direct reaction of the "building blocks" with or without the aid of a catalyst.

Appropriate selection of the side chains enables the resulting HLB (hydrophilic/lipophilic balance) to be tailored. If the medium for which the innovative graft copolymer is prepared is predominantly hydrophilic then the base polymer will likewise be selected from the class of predominantly hydrophilic polymers (e.g., polyethylene glycol (PEG) in Example B of U.S. Pat. No. 5,627,232.

If, however, the field of use is an entirely apolar medium, such as a polyethylene or polypropylene, for example, then a predominantly apolar base polymer is used, e.g., a long-chain and terminal diol or a polyethylene wax containing terminal OH groups.

For partly hydrophilic and hydrophobic systems it is also possible to use a correspondingly adapted base polymer based on polyethylene glycol, propylene glycol, polytetrahydrofuran or combinations and/or block polymers thereof, the corresponding polarities being introduced by way of the base polymer.

The aminoplast central unit is preferably composed of monomers of the formulae

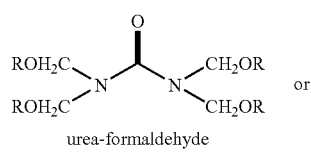

urea-formaldehyde

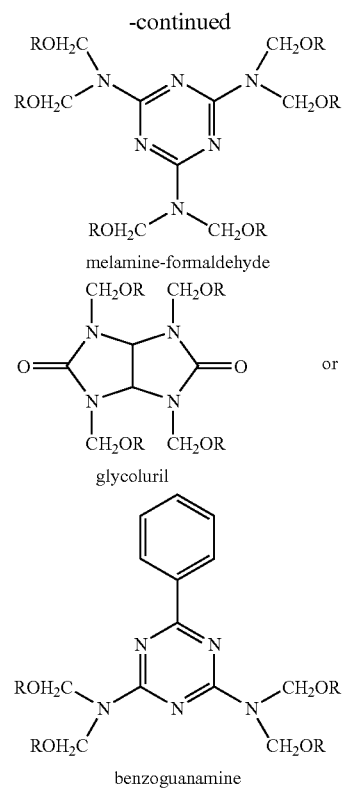

in which R is a lower alkyl group, preferably a methyl or ethyl group.

The base polymer chain $(B_a)$ to $(B_c)$ is preferably a polyalkylene moiety, e.g., a polyethylene or polypropylene moiety; a polyoxyalkylene moiety, e.g., a polyoxyethylene or a polyoxy(ethylene-butylene) moiety; a polyurethane moiety, a polyoxyacrylate or polyoxymethacrylate moiety, a polycarbonate moiety and/or a polysiloxane moiety.

In the graft polymers or copolymers of the invention the side groups $(S_1)$ to $(S_3)$ can be selected from hydrophobic and/or hydrophilic side groups, particularly from unilaterally alkyl-terminated polyethylene/polypropylene copolymers, saturated or unsaturated $C_9$-$C_{36}$ alkyl ethoxylates, $CH_3$—O—$[CH_2$—$CH_2$—O—$]_p$H, alk-O—$[CH(CH_3)CH_2$O—$]_p$H, or $CH_3$—$(CH_2)$nCH=CH—$(CH_2)$m-$CH_2$OH (n, m, p=1 to 500). These side groups can also be used as R1.

Preferably in the graft polymers or copolymers n is an integer from 1 to 500, in particular from 1 to 100, e.g., from 1 to 50.

In the graft polymers or copolymers of the invention the base polymer chains $(B_a)$ to $(B_b)$ can be substantially polar and the side chains $(S_1)$ to $(S_4)$ substantially apolar, or vice versa. Additionally the graft polymers or copolymers of the invention can be in solid or liquid form and can have the molar mass indicated above for the aminoplast ether copolymers of the invention.

The aminoplast-based copolymers of the invention are surprisingly highly suitable, as mentioned above, as dispersants and/or stabilizers for pigments and/or fillers, and also in particular for preparing pigment concentrates for aqueous systems. In this context the dispersant and/or stabilizer is homogenized together with the pigments and/or fillers to be dispersed, optionally in the presence of organic solvents and/or water, optionally with binders and optionally with customary coatings auxiliaries. The above-described copolymers may also be used for preparing a coating composition, in which case a binder, optionally a solvent, pigments and/or fillers, the copolymer and optionally auxiliaries are dispersed together. The copolymers of the invention according to claim 1 provide an innovative class of dispersants having unexpectedly good properties for aqueous systems.

For the preparation of aqueous pigment pastes according to one preferred embodiment from 0.1% to 100% by weight of the copolymers of the invention, preferably from 0.2% to 80% by weight (based on the weight of the pigments) are added. This, however, is dependent on the surface area to be covered on the solid to be covered. Carbon black requires very much more dispersant than, for example, $TiO_2$. The dispersants are generally applied to the solids in the presence of solvents and/or water. Alternatively they may be applied directly to the solids that are to be dispersed. For that purpose the copolymers can be mixed with the pigments to be dispersed or dissolved directly the dispersing medium (water, optionally additions of glycol ether) prior to or simultaneous with the addition of the pigments and, where used, other solids.

The dispersants or stabilizers of the invention are particularly suitable for preparing pigment concentrates. Aqueous, highly concentrated, pumpable and flowable pigment preparations can be prepared in a simple way by dissolving the copolymer of the invention in water, together if desired with a further component, adding the pigment with stirring, and dispersing the mixture until the desired fineness and consistency is achieved. Another method consists in mixing a pigment or filler with the copolymer of the invention; the mixture can be dispersed in water if necessary. Furthermore, an aqueously moist pigment filtercake can be admixed with the copolymer of the invention and incorporated into the pigment filtercake using a dissolver, for example.

The dispersants or stabilizers of the invention can be used for any desired pigments and fillers. Examples of pigments to be dispersed are familiar to the skilled worker and are disclosed for example in DE-A-199 04 603 on pages 6 and 7, hereby explicitly incorporated by reference. The solids (fillers) to be dispersed for which the copolymers of the invention can be used include—without being restricted to—the organic and inorganic pigments that are known to the skilled worker, which can be found both in Pigment Handbook, Vols. 1-3, John Wiley & Sons, New York, 1988 and in Ullmann's Encyclopedia of Industrial Chemistry, Volume 5, Vol. 20.

BRIEF DESCRIPTION OF THE DRAWINGS

The invention is now illustrated with reference to the following, non-limiting examples; in the drawings

FIGS. 2.1 to 2.3 show preferred copolymers according to the invention, where b, c, d and e are any integer, preferably from 1 to 100, in particular from 1 to 50, and e is preferably defined like a (cf. above) b, c, d and e can also be 0 if at least one of them is 1.

PREPARATION EXAMPLES

Example 1 (in Solution)

Figure 1:
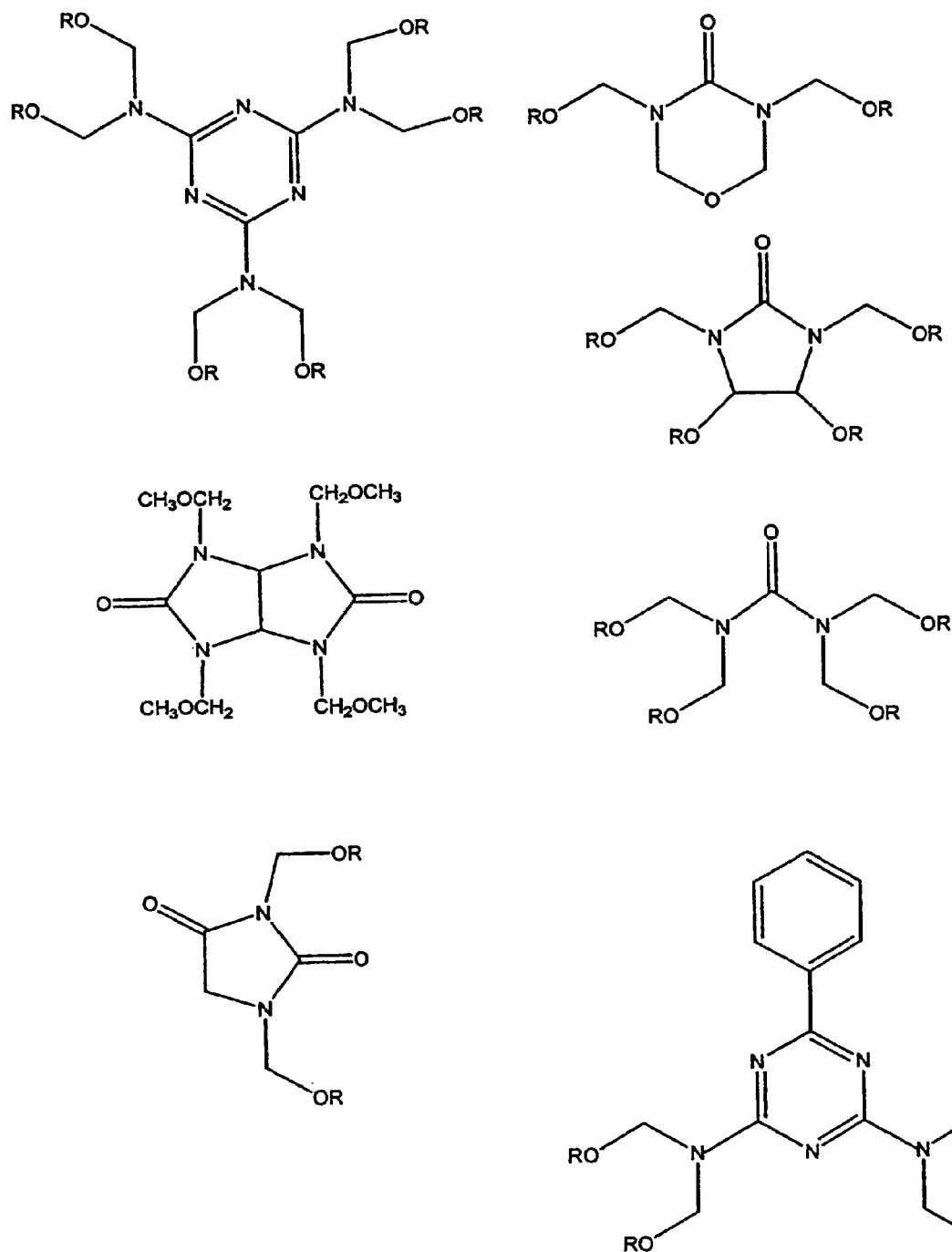
FIG. 1 shows examples of aminoplast central units (Z), corresponding to the more general definition of claim 20.

A reaction vessel is charged with 17 g of polytetrahydrofuran having a molar mass of 2900 (PolyTHF 2900; BASF), 3.73 g of glycoluril (Powderlink® 1174; Cytec), 87.93 g of monomethoxyethylene glycol with a molar mass of 5000 and 400 ml of toluene, this initial charge is heated to 135° C. under nitrogen and traces of moisture are removed by azeotropic distillation. After 1 hour the reaction is initiated by adding 0.48 g of Nacure 5076 (70% dodecylbenzenesulfonic acid in isopropanol, Worlee) under a vacuum of 530 mbar and continuous dropwise addition of fresh toluene. The course of the reaction can be monitored by gas chromatography analysis of the distillate for the amount of methanol it contains. After a reaction time of approximately 5 hours the conversion is quantitative and the reaction is halted by adding 0.31 g of triethanolamine (Acros). Reaction is allowed to continue for 10 minutes under nitrogen, the clear, viscous solution is poured into trays and the product is dried to constant mass in a vacuum drying oven at 60° C. Analysis of the polymer obtained by gel chromatography indicates an $M_n$ value of 19 100 (calibration against polystyrene/THF) with an $M_n/M_w$ ratio of 1.42. Evaluation of the peak area of the monomer indicated a residual monomer content of 10%.

Example 2 (in Bulk)

A sigma mixer is charged with 1700 g of polytetrahydrofuran (PolyTHF 2900; BASF), 373 g of Powderlink® 1174; Cytec) and 8793 g of polyglycol M 5000 S (Clariant). The reactants are dried at 105° C. and a vacuum of 40 mbar with stirring at 30 rpm for about 3 hours until gas is no longer evolved. The vacuum is broken with nitrogen and the reaction is initiated by adding 48 g of Nacure® 5076 (70% dodecylbenzenesulfonic acid in isopropanol, Worlee). Kneading is carried out under vacuum at 30 rpm. After a reaction time of approximately 1.5 hours the reaction mixture becomes highly viscous. By adding 31 g of triethanolamine (Acros) and 1 g of 2,6-di-tert-butyl-4-methylphenol (antioxidant) the reaction is halted under nitrogen. The product is waxlike and soluble in water. The reaction time is important for the product properties, with reaction times of from about 2 to 10 hours, in particular from 2.5 to 8 hours, being preferred for products having molar masses of from 2500 to 40 000.

Examples 3 to 14

Further copolymers were prepared in accordance with Example 1, varying the stoichiometry and the chemical structure of the bifunctional or monofunctional organic compounds. The individual compositions are specified in Table I, the abbreviations used being as follows:

THF: Polytetrahydrofuran

BA: Poly-n-butyl acrylate diol

MMA: Polymethyl methacrylate diol

PC: Polycarbonate diol

PPG: Polypropylene glycol

PEG: Polyethylene glycol

MPEG: Monomethoxypolyethylene glycol with a molar mass of 5000

MPEG2: Monomethoxypolyethylene glycol with a molar mass of 2000

HEEU: Hydroxyethylethyleneurethane

DMP: Dimethoxypropionic acid

TABLE I

| Example | Organic compound B [mol] | | Organic compound R1 [mol] | | Powderlink 1174 [mol] | Initiator [mol] |
|---|---|---|---|---|---|---|
| 1 | THF | 0.006 | MPEG | 0.018 | 0.012 | 0.0015 |
| 2 | BA | 0.010 | MPEG | 0.030 | 0.020 | 0.003 |
| 3 | MMA | 0.010 | MPEG | 0.030 | 0.020 | 0.003 |
| 4 | PC | 0.006 | MPEG | 0.018 | 0.012 | 0.002 |
| 5 | PPG | 0.015 | MPEG HEEU | 0.023 0.023 | 0.030 | 0.007 |
| 6 | PEG | 0.015 | MPEG HEEU | 0.023 0.023 | 0.030 | 0.007 |
| 7 | THF | 0.014 | MPEG2 | 0.041 | 0.028 | 0.0012 |
| 8 | BA | 0.010 | MPEG | 0.030 | 0.020 | 0.0014 |
| 9 | MMA | 0.023 | MPEG | 0.070 | 0.043 | 0.007 |
| 10 | PC | 0.015 | MPEG | 0.045 | 0.030 | 0.003 |
| 11 | PPG | 0.015 | MPEG 2 HEEU | 0.023 0.023 | 0.030 | 0.004 |
| 12 | BA | 0.020 | MPEG | 0.020 | 0.020 | 0.0024 |
| 13 | PC | 0.020 | MPEG | 0.020 | 0.020 | 0.0024 |
| 14 | BA DMP | 0.020 0.020 | MPEG 2 | 0.060 | 0.080 | 0.0030 |

The reaction time is between about 2 and about 7 hours.

Use Examples

Example 15 (Pigment Paste)

To assess the compounds of the invention pigment concentrates were prepared without additional binder and an evaluation was made of their viscosity, which is a measure of the dispersibility of a solid. To prepare the pigment pastes the copolymers of the invention (ex. 1 to 4) are initially dissolved at 20% strength in water, the solutions are mixed with water and auxiliaries and the pigments are added. Dispersing takes place following the addition of grinding media (70 g of glass beads of 2 to 3 mm) in a dispersing apparatus (Dispermat) with a single Teflon disc at 8000 rpm for 20 minutes with water cooling. This gives flowable pigment pastes, which were added to a white paint (acrylic paint, Akzo-Nobel). The test formulations were drawn down and assessed by the rub-out test. Additionally the compatibility of the compounds of the invention with binders was tested. For that purpose 5% of additive (examples 1 to 14 of Table I; 20% strength in water) were stirred into the binder dispersion using a Pendraulik stirrer (type LD50) with toothed dissolver disc (level 1-2), and the resulting systems were applied and inspected.

The viscosity of the pigment pastes was measured using the Bohlin CS viscometer (Bohlin Instruments); colorimetry was carried out with the TCS instrument from BYK Gardner. The comparative additive used was Disperbyk 190 (BYK Chemie).

Formulation of the White Paste (Amounts in Parts by Weight)

| 70.0 | titanium dioxide 2310 (Kronos) |
| 8.8 | additive solution, 40% strength |
| 1.0 | defoamer (BYK 0.24; BYK-Chemie) |
| 15.8 | water |

Formulation of the Blue Paste (Amounts in Parts by Weight)

| 29.2 | Heliogen Blue L 7072 D (BASF) |
| 29.2 | additive solution, 40% strength or |
| 58.4 | additive solution, 20% strength |
| 0.8 | defoamer (e.g., BYK 024, BYK Chemie) |
| 0.3 | preservative (e.g., Acticide SPX, Thor) |
| 40.5 | or 11.3 water |

Formulation of the Iron Oxide Paste (Amounts in Parts by Weight)

| 60.0 | iron oxide (Bayferrox 130 M; Bayer AG) |
| 10.5 | additive solution (40% strength) |
| 1.0 | defoamer |
| 28.5 | water |

Test Paint
Ready-mixed white paint (acrylic paint, Akzo-Nobel)

Results

TABLE II

Paste viscosity (mPa) at rotational speed D [s$^{-1}$]

| Pigment | Example | D = 10 [s$^{-1}$] | D = 100 [s$^{-1}$] | D = 1000 [s$^{-1}$] |
|---|---|---|---|---|
| Kronos 2310 24 h or 4 weeks | Comparative | 426 | 191 | 98 |
| | 2 | 810 | 416 | 161 |
| | 4 | 1629 | 850 | 344 |
| | 8 | 1007 | 551 | 151 |
| | 12 | 532 | 204 | 102 |
| Heliogen Blue L7072 D after 24 h | Comparative | 726 | 189 | 64 |
| | 2 | 397 | 255 | 154 |
| | 4 | 979 | 486 | 204 |
| | 8 | 50 | 42 | 35 |
| | 12 | 2998 | 892 | 293 |
| Heliogen Blue L7072 D after 4 weeks/40° C. | Comparative | 542 | 156 | 69 |
| | 2 | 332 | 218 | 139 |
| | 4 | 781 | 403 | 205 |
| | 8 | sediment | — | — |
| | 12 | 2376 | 771 | 273 |
| Iron oxide Bayferrox 130 M after 24 h | Comparative | 617 | 145 | 48 |
| | 2 | 2195 | 411 | 97 |
| | 48 | 941 | 370 | 144 |
| | 8 | 1657 | 267 | 130 |
| | 14 | 1132 | 366 | 181 |
| Bayferrox 130 M after 4 weeks/40° C. | Comparative | 710 | | |
| | 2 | sediment | 177 | 62 |
| | 4 | 3521 | | |
| | 8 | sediment | 584 | 123 |
| | 14 | 1443 | 528 | 185 |
| | | 2003 | 374 | 144 |
| | | 1200 | 388 | 185 |

TABLE III

Colorimetry of the pigment concentrate/white paint blend 1/99

| | Example | Lightness L* | Delta E after rub-out* |
|---|---|---|---|
| Heliogen Blue L7072 D (which 24 h or 4 weeks?) | Comparative | 80.2 | 9.6 |
| | 2 | 79.3 | 8.3 |
| | 4 | 76.7 | 0.5 |
| | 8 | 78.8 | 5.3 |
| | 14 | 79.3 | 7.6 |
| Bayferrox | Comparative | 66.5 | 1.07 |

TABLE III-continued

Colorimetry of the pigment concentrate/white paint blend 1/99

| | Example | Lightness L* | Delta E after rub-out* |
|---|---|---|---|
| 130M | 2 | 65.7 | 1.02 |
| | 4 | 66.3 | 0.58 |
| | 8 | 65.3 | 0.42 |
| | 14 | 66.2 | 1.13 |

*determined using the TCS colorimeter from BYK-Gardner

TABLE IV

Compatibility with binder (5% dispersant, based on binder)

| Example | PVA (Mowolith LDM1871) | PU (Alberdingk U 610) | AC (Neocryl XK-90) | SA (Acronal S 559) |
|---|---|---|---|---|
| Comparative | moderate | good | good | moderate |
| 2 | good | good | good | good |
| 4 | good | good | good | good |
| 8 | moderate | good | good | moderate |
| 12 | good | good | good | good |

All of the dispersants investigated in Table IV are highly compatible with the binders investigated and do not show any adverse effects on gloss, drying or water resistance.

The invention claimed is:

1. Water-soluble aminoplast ether copolymers of the following structural type:

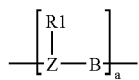

where:
Z comprises an aminoplast unit based on a glycolurile of formula

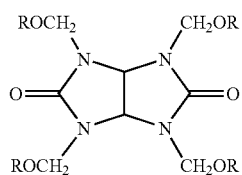

wherein R is selected from the group consisting of hydrogen, alkyl groups, and acyl groups;
B comprises a radical of an essentially water-insoluble polymer selected from poly-n-butyl acrylate, poly-n-butyl methacrylate, polyethyl acrylate, polytetrahydrofuran, polyethyl methacrylate, polymethyl acrylate, polymethyl methacrylate, a predominantly aliphatic polycarbonate and a predominantly aromatic polycarbonate, which are able to react with the OR-function of the aminoplast unit,
R1 comprises a radical of a hydrophilic organic compound containing at least one functional group which is able to react with the OR group of the aminoplast unit to form an ether bond, selected from the group consisting of a radical of methylcellulose, polyacrylic acid, polymethacrylic acid, ethylene/acrylic acid/sodium acrylate copolymer, polyalkylglycol, polyvinyl alcohols and polyvinylpyrrolidone, and
a is at least 1;
wherein the overall mass of the water-soluble aminoplast ether copolymer is from about 2000 to 50 000 g/mol.

2. Aminoplast ether copolymers of claim 1 wherein R is selected from the group consisting of alkyl groups having 1 to about 4 carbon atoms, and acyl groups having 1 to about 4 carbon atoms.

3. Aminoplast ether copolymers of claim 1 wherein R is selected from the group consisting of methyl and ethyl groups.

4. Aminoplast ether copolymers of claim 1 wherein the R1 radical has a molar mass of from about 500 to 30 000 g/mol.

5. Aminoplast ether copolymers of claim 1 wherein the B radical has a molar mass of from about 100 to 30 000 g/mol.

6. A process for preparing an aminoplast ether copolymer of claim 1 comprising reacting the aminoplast unit Z with B and R1 radicals or with prepolymers formed therefrom under acidic catalysts in solution.

7. The process according to claim 6, wherein the reaction is carried out in a one-pot process in from 15% to 35% strength solution in respect of total reactants used at 70 to 130°C., and, after reacting for about 2 to 10 h, adding a neutralizing agent, to obtain molar masses of the copolymers of from about 2000 to 50 000 g/mol.

8. An Aminoplast ether copolymers obtained by the process of claim 6.

9. A dispersant or stabilizer for pigments or fillers comprising the aminoplast ether copolymers of claim 1.

10. The dispersant or stabilizer of claim 9 mixed in an aqueous system.

11. A coating composition, comprising a binder, pigments and/or fillers, and the aminoplast ether copolymer of claim 1 dispersed together.

12. A pigment paste comprising a pigment, a solvent and the aminoplast ether copolymer of claim 1.

13. The aminoplast ether copolymers of claim 1 wherein the essentially water-insoluble polymer B comprises a hydroxyl function.

* * * * *